US006322389B1

(12) United States Patent
Reese et al.

(10) Patent No.: US 6,322,389 B1
(45) Date of Patent: Nov. 27, 2001

(54) CONNECTION ASSURANCE BRACKET SYSTEM

(75) Inventors: Gregory S. Reese, Sterling Hts, MI (US); William G. Flask, Youngstown; John H. Bakker, Cortland, both of OH (US); Brian R. Nagy, Taylor; Matthew K. Monden, Harrison Twp., both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/438,868

(22) Filed: Nov. 12, 1999

(51) Int. Cl.[7] .......... H02B 1/01

(52) U.S. Cl. .......... 439/553; 439/557

(58) Field of Search .......... 439/553, 552, 439/554, 555, 556, 557, 489, 527, 571, 542

(56) References Cited

U.S. PATENT DOCUMENTS 5,919,057 * 7/1999 Kameyama .......... 439/364

* cited by examiner

*Primary Examiner*—Gary Paumen
*Assistant Examiner*—Ross Gushi
(74) *Attorney, Agent, or Firm*—Thomas N. Twomey

(57) ABSTRACT

A connection assurance bracket system (100) which is interfaced between mutually interconnectable first and second connectors (108, 118) to provide assurance of the connection therebetween and eliminate relative motion therebetween. A connection assurance bracket (102) has a flattened horseshoe-shaped base (104) defining a rectangular cut-out (145), wherein a cantilever beam (106) projects normally therefrom. The first connector includes a pump-handle lock (110) for engaging a ramped boss (120) of the second connector. The pump-handle lock features a beam seat (112) for receiving a distal end portion (106*a*) of the cantilever beam, wherein the distal end (106*b*) thereof has a lip (140). The first connector further includes left and right rear guide tabs (114, 116) which abut opposing left and right end walls (126, 128) of the cut-out, as well as left and right forward guide tabs (162, 164) for respectively engaging left and right tab collets (122, 124) of the second connector. In operation, the first connector is mounted onto the connection assurance bracket so as to be at a prestaged position, wherein the left and right rear guide tabs abut the left and right end walls and the distal end portion of the cantilever beam is fully seated in the beam seat of the pump-handle lock. As the second connector approaches the first connector, the left and right forward guide tabs guidably enter into the left and right tab collets. Thereafter, as engagement force is further applied the pump-handle lock is forced to surmount the ramped boss with a snap action, whereupon the lip immediately projects forward, and free from, the pump-handle lock, whereat the first and second connectors are mutually fully engaged and are slidable in unison with respect to the connection assurance bracket.

10 Claims, 6 Drawing Sheets

CONNECTION ASSURANCE BRACKET SYSTEM

TECHNICAL FIELD

The present invention relates to electrical connectors, and more particularly to a connection assurance bracket system which is operably interfaced with first and second mutually interconnectable connectors.

BACKGROUND OF THE INVENTION

The door of motor vehicles includes an exterior door panel and a mated inner door frame, conventionally composed of sheet metal but may be composed of another material. The inner frame has an access port for assembly and service of components within the door, such as window lift mechanisms and door lock components. While in the past, it was considered sufficient to merely provide a flexible plastic film over the access port to serve as a water barrier, it has become an increasingly standard practice to provide a rigid plastic port cover which is affixed to the inner door frame so as to seal the port. The door trim panel is also a formed rigid plastic piece which is mated to the inner door frame after the port cover has been installed. This installation is complicated because motor vehicles today contain an array of electrical connections which must be effected between the door trim panel and the inner door frame (inclusive of the port cover).

An example of a prior art electrical connection between a door trim panel and an inner door frame is depicted at FIG. 1. A female connector 10 has stand-off tabs 12 which are immovably affixed by screws 14 to a stanchion member 16 which is integrally connected to a door trim panel 18 which is, in turn, to be fitted to an inner door frame (an example thereof is shown in FIG. 7). The female connector 10 includes a pump-handle lock 22 and left and right guide tabs 24, 26 at either side thereof. A male connector 28 includes a ramped boss 30 and left and right tab collets 32, 34 located at either side thereof. The left and right tab collets are pivotally connected, via mounting studs 36, to an attachment housing which is connected, such as by a slide mount interface, to a port cover, which is, in turn, sealably affixed to the inner door frame (see generally FIGS. 6 and 7). In operation, as the door trim panel is fitted to the inner door frame, the left and right guide tabs enter into the left and right tab collets until the pump-handle lock rides over the ramped boss, whereupon the female and male connectors are locked into mutual engagement.

There are two primary concerns with respect to electrical connections made between the inner door frame and the door trim panel. Firstly, it is essential that when the door trim panel is mated to the inner door frame, any connections therebetween are assuredly attained without an undue amount of manipulation or inspection being required by the assembler. Secondly, over time any connection made between the inner door frame and the door trim panel is subjected to relative motion between the first and second connectors. Relative motion between the male and female connectors may be caused, for example, by vibration and surface flexing as the motor vehicle is driven, by temperature variations, or by forces exerted by the passenger on the door trim panel. Relative motion between the male and female connectors can eventually cause electrical connections to fail not only because of direct mechanical failure but for other reasons, such as for example corrosion originating at wear sites.

Accordingly, what remains needed in the art is a connection modality between the inner door frame and the door trim panel which provides assurance of a connection between first and second connectors and lack of relative motion therebetween.

SUMMARY OF THE INVENTION

The present invention is a connection assurance bracket system which is interfaced between first and second connectors to provide assurance of the connection therebetween and eliminate relative motion therebetween.

The connection assurance bracket system includes a connection assurance bracket and a first connector interfaceable therewith in a pre-staged position. The connection assurance bracket has a flattened horseshoe-shaped base defining a rectangular cut-out, wherein a cantilever beam is integral therewith and projects normally therefrom. The first connector includes a pump-handle lock for engaging a ramped boss of a second connector intended for connecting with the first connector. The pump-handle lock features a beam seat for receiving a distal end portion of the cantilever beam, wherein the distal end thereof has a lip. The first connector further includes left and right rear guide tabs which abut opposing left and right end walls of the cut-out, as well as left and right forward guide tabs for respectively engaging left and right tab collets of the second connector.

In operation, the base is affixed to an elevated location of the door trim panel, such as for example on stanchions, wherein the cantilever beam projects away from the door trim panel. The first connector is mounted onto the connection assurance bracket so as to be at the prestaged position, wherein the left and right rear guide tabs abut the left and right end walls and the rear side of the base, and wherein the distal end portion of the cantilever beam is fully seated in the beam seat of the pump-handle lock. A second connector is mounted to the inner door frame at the port cover thereof by any suitable modality, as for example a slide-mount.

As the door trim panel is mounted to the inner door panel, the left and right forward guide tabs guidably enter into the left and right tab collets. A point is then soon reached whereupon the pump-handle lock must engage the ramped boss if any further engagement is to occur, this constitutes a prestage position of the second connector with respect to the first connector. As engagement force is further applied, the force is transmitted back by the inner door frame via the distal end (and the lip) of the cantilever beam to the pump-handle lock, whereby the pump-handle lock is forced to surmount the ramped boss with a snap action, whereupon the lip immediately projects forward, and free from, the pump-handle lock. The staged position is now achieved, whereat the first and second connectors are mutually fully engaged and are slidable in unison with respect to the connection assurance bracket over a slidable distance defined by opposing abutments, respectively, of the base and the lip with respect to the first and second connectors.

It will be seen, therefore, that the cantilever beam serves as a retention feature to hold the first connector at the prestaged interface, as an abutment defining one extreme of sliding travel, and as a manual release effected by the lip being lifted back into the beam seat. The snap action occurring when the lip becomes free of the pump-lock is a noticeable mechanical event that audibly and tactilely indicates to an assembler that the pump-handle lock has engaged the ramped boss of the second connector and, consequently, the first and second connectors are fully engaged with each other. The left and right forward guide tabs are enlarged to provide an early alignment feature as the door trim panel and the inner door frame are being mated. Lastly, the cantilever beam, in association with the left and right rear guide tabs, allows for in-and-out movement between the door trim panel and the inner door frame without causing the first connector to be moved relative to the second connector.

Accordingly, it is a preferred object of the present invention to provide a modality for mounting a first connector to a first article and mounting a second connector to a second article, wherein relative spatial variation between the first and second articles does not result in relative movement between the first and second connectors.

This, and additional objects, advantages, features and benefits of the present invention will become apparent from the following specification.

DESCRIPTION OF THE PREFERRED EMBODIMENT

Figure 1:
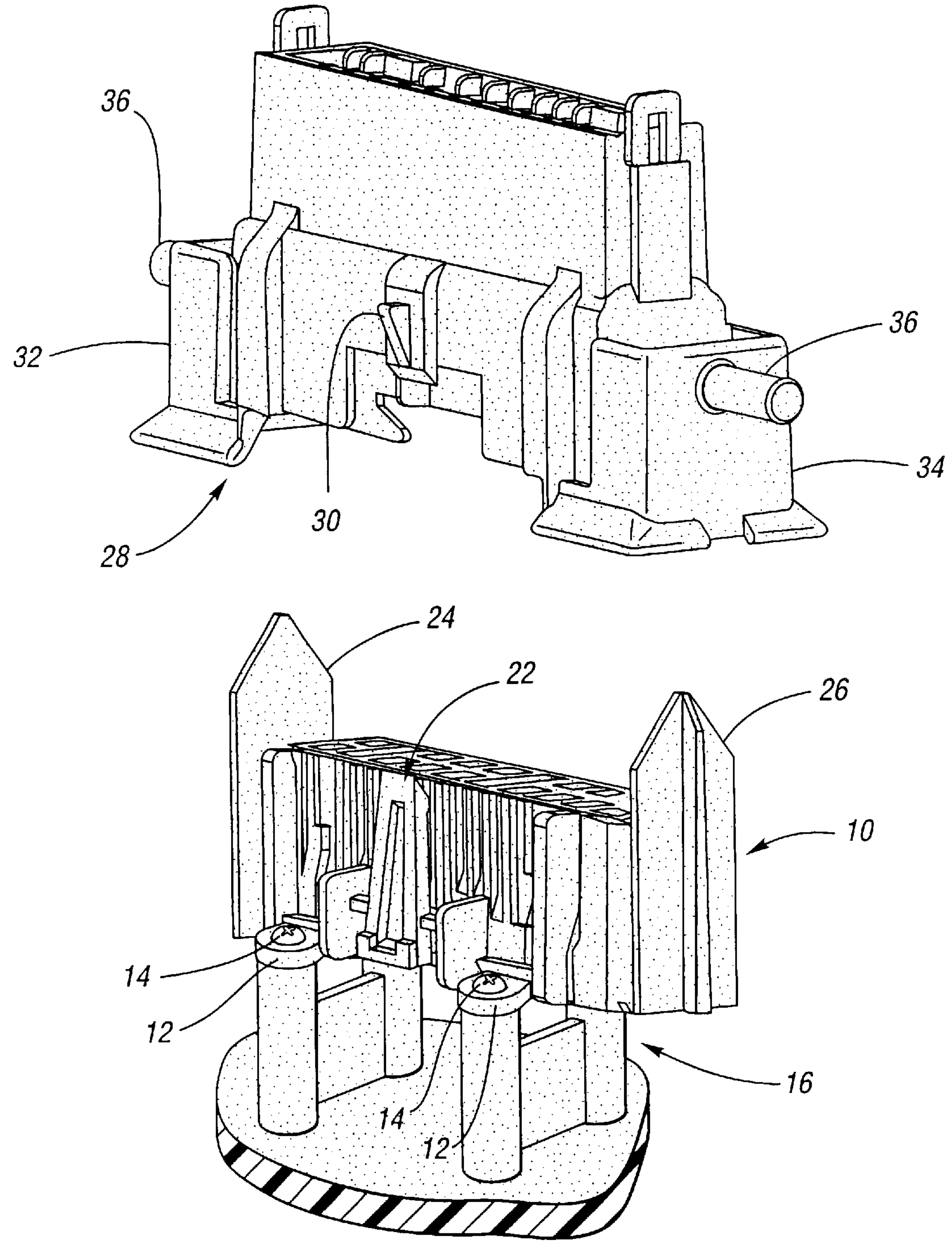
Prior Art Fig. 1
FIG. 1 is an exploded, partly sectional perspective plan view of a prior art male and female electrical connection between an inner door frame and a door trim panel.

Referring now to the Drawing, FIGS. 2 through 10 depict various aspects of the connection assurance bracket system 100. An overview of the preferred embodiment of the connection assurance bracket system 100 may be gleaned from FIG. 2. A connection assurance bracket 102, having a base 104 and a cantilever beam 106, is connected via the base to a first article (not shown, but for example the first article may be a door trim panel). A first connector 108 has a male or female connector interface, a female connector interface 108*a* being shown. The first connector 108 further has a pump-handle lock 110 featuring a beam seat 112, and further has left and right rear guide tabs 114, 116. A second connector 118 has the other of a male or female interface, wherein in the present embodiment a male connector interface is present for connecting with the female connector interface 108*a* of the first connector 108, and wherein a shroud 118*a* of the second connector receives the female connector interface. The second connector 118 is connected to a second article (not shown, but for example the second article may be a port cover of an inner door frame), has a ramped boss 120 and left and right tab collets 122, 124. The first and second connectors 108, 118 may be any mutually interconnectable (male to female) connectors of any type, as for example electrical (as depicted), fiber optic and hybrids thereof.

In operation, the first connector is prestaged in relation to the connection assurance bracket 102 by a distal end portion 106*a* of the cantilever beam 106 being seated into the beam seat 112, whereupon the left and right guide tabs 114, 116 abut end walls 126, 128 of the base 104. The second connector 118 becomes prestaged relative to the first connector when the pump-handle lock initially encounters the ramped boss 120. Application of further engagement force causes the pump-handle lock to snappingly surmount the ramped boss, and causes the distal end portion of the cantilever beam to be snapped free of the beam seat, whereupon the first and second connectors are fully engaged and locked together. Now the first and second connectors may slide, as a single unit, with the second article relative to the connection assurance bracket (and, therefore, the first article), and yet remain connected with the first article via the connection assurance bracket.

Referring now additionally to FIGS. 3 through 10 the structural and functional aspects of the connection assurance bracket system will be further detailed.

Figure 2:
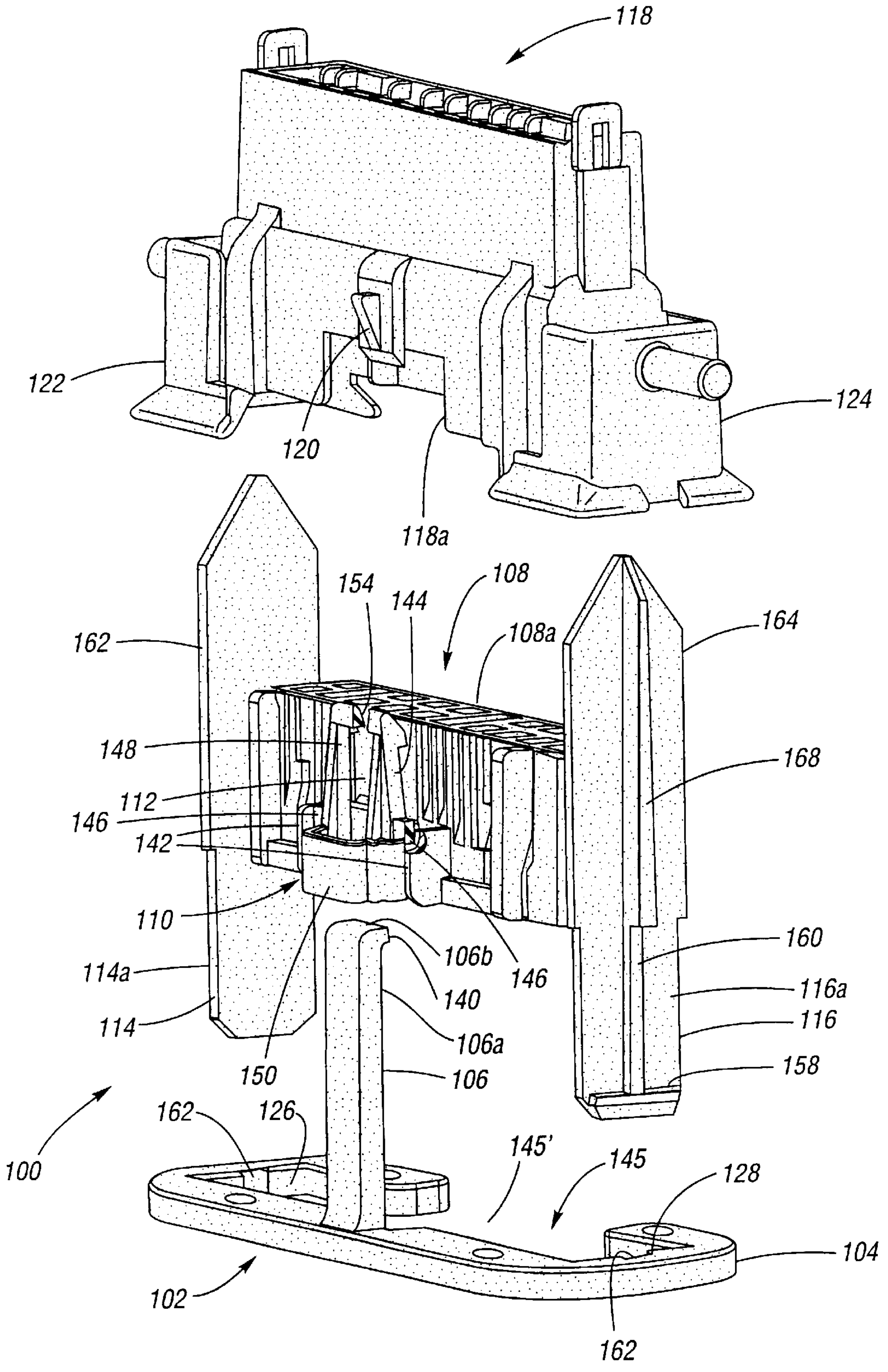
FIG. 2 is an exploded, perspective plan view of a connection assurance bracket system according to the present invention for providing assured connection between first and second connectors, wherein spatial movement of an inner door frame relative to a door trim panel does not cause relative movement between the first and second connectors.
Figure 3:
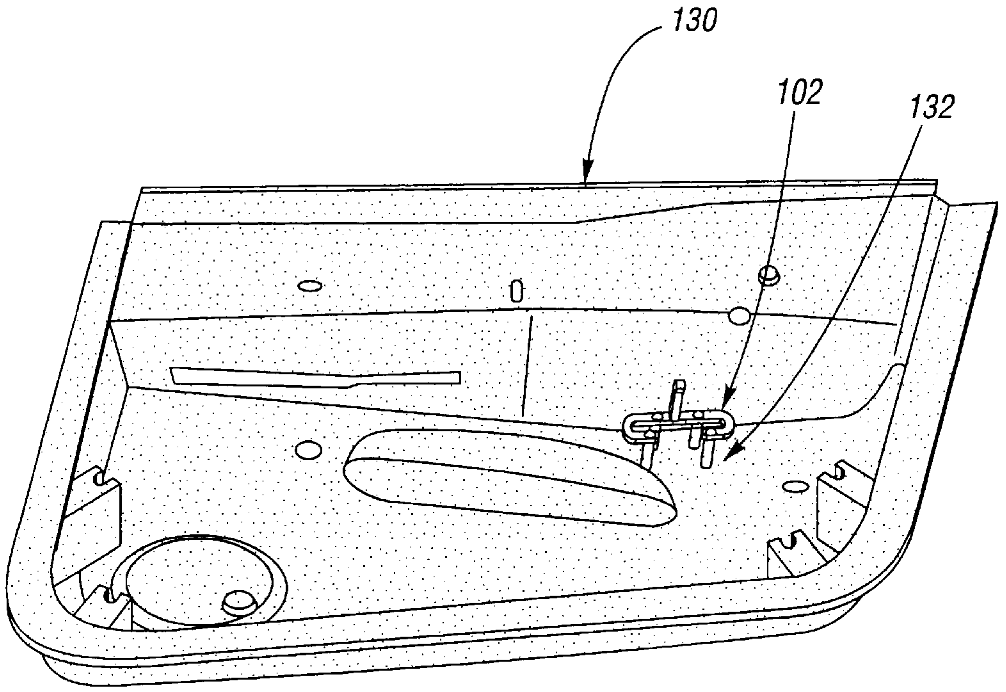
FIG. 3 is a perspective view of a door trim panel with the connection assurance bracket connected thereto.

FIG. 3 depicts an example of a door trim panel 130 having a stanchion member 132 which is connected to the connection assurance bracket 102 at the base 104 thereof via threaded fasteners 134 and further via alignment dowels 136 of the stanchion member. The base 104 of the connection assurance bracket 102 has a flattened horseshoe-shaped shape, wherein a slot 145' communicates with an inner rectangular cut-out 145 (see FIG. 2). The slot 145' allows cables C from the first connector 108 to pass therethrough as the first connector is prestaged on the connection assurance bracket 102. The cantilever beam 106 is formed integrally with the base 104 opposite the slot 145', such as by a plastic injection molding process. The distal end portion 106*a* of the cantilever beam 106 terminates at a distal end 106*b* whereat a lip 140 projects perpendicular to the cantilever beam in a direction overhanging the cut-out 145.

Figure 5:
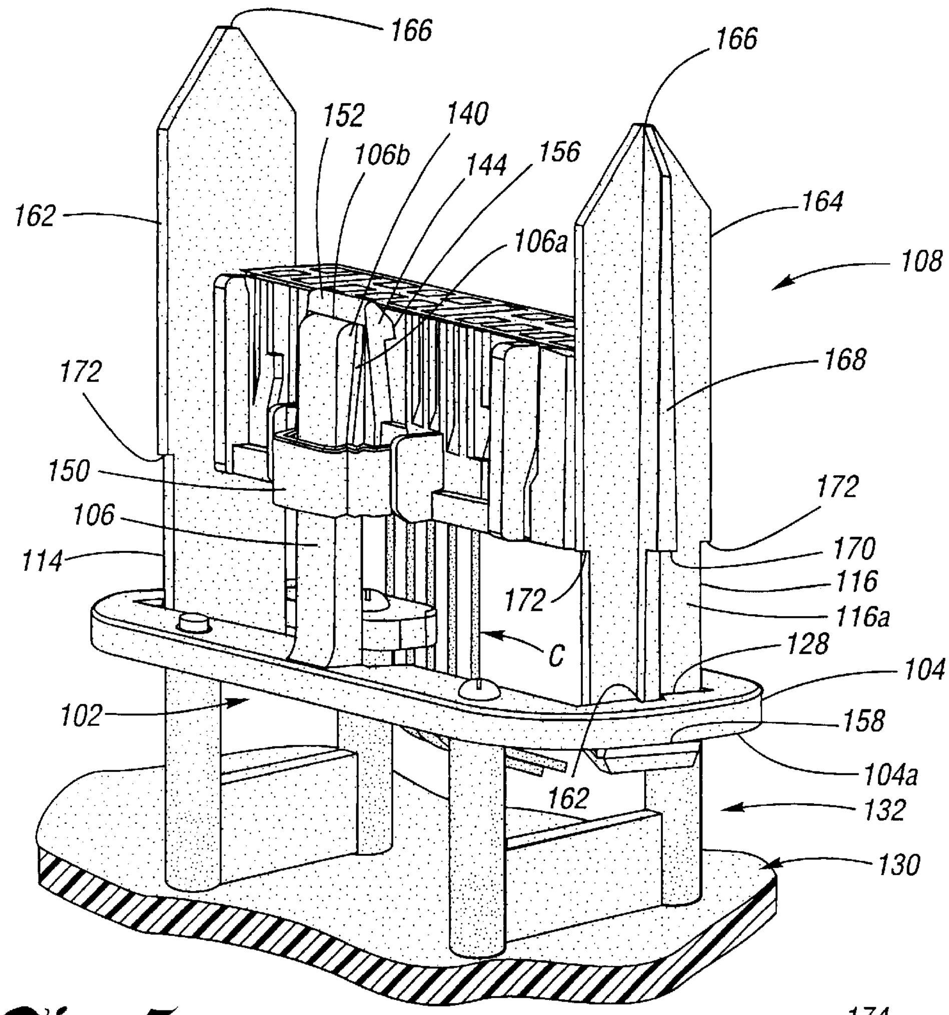
FIG. 5 is a partly sectional, perspective view of the connection assurance bracket mounted to the door trim panel, wherein now a first connector is mounted thereto at a prestage position.

The pump-handle lock 112 includes a pair of opposed wings 142, wherein a lock-arm 144 is mounted therebetween by a pair of resilient bars 146 (see FIG. 2). The lock-arm 144 has an interior opening 148 which provides the aforementioned beam seat 112. A beam brace 150 is connected to the lock-arm 144 in an elevated relation thereto so that the distal end portion of the cantilever beam is passable thereunder. The remote end of the lock-arm 144 has a lock-bar 152 which also defines the forward end of the beam seat 112. The beam seat 112 is dimensioned to receive the distal end portion 106*a* of the cantilever beam 106 in a prestaged relationship therebetween, whereat the distal end 106*b* (including the lip 140) interferingly abuts the lock-bar 146 and the beam brace 150 captures the cantilever beam in the beam seat, as shown at FIG. 5. A rounded riser is preferably formed on the under surface of the beam brace 150 in order to provide a minimal friction contact with the cantilever beam. It is preferred for the lock-bar 152 to have a lead ramp 154 and have a pair of enlarged outboard ramps 156. In this regard, the lock-arm 144 is resiliently pivotable on the bars 146, whereupon the ramps 154, 156 may ride over raised surfaces of the second connector 118.

Turning attention to FIGS. 2 and 5, the left and right rear guide tabs 114, 116 project in a direction away from the female connector interface 108*a*, and terminate, respectively, with a left and right rear guide tab abutment 158 on the respective outboard sides 114*a*, 116*a* thereof (side 114*a* being identically configured as visible side 116*a* in FIGS. 2 and 5). A rib 160 runs longitudinally along each outboard side 114*a*, 116*a*.

When the connection assurance bracket 102 is prestaged with respect to the first connector, as shown at FIG. 5, the distal end portion 106*a* of the cantilever beam 106 is seated in the beam seat 112, wherein the distal end 106*b* (and the lip 140 thereat) interferingly abuts the lock-bar 152; the outboard sides 114*a*, 116*a* abut respective left and right end walls 126, 128, wherein the rib 160 fits into a wall slot 162; and the left and right rear guide tab abutments 158 interferingly abut the base 104 on a side 104*a* that is opposite the cantilever beam 106, wherein the first connector is held in the prestage position relative to the connection assurance bracket by the abutment of the distal end with the lock-bar and by the opposing abutment of the left and right rear guide tab abutments with the base.

The first connector further has left and right forward guide tabs 162, 164 which are, respectively, aligned with the left and right rear guide tabs 114, 116. The remote end 166 of each of the left and right forward guide tabs 162, 164 is preferably pointed to facilitate guided entry into respective left and right tab collets 122, 124 of the second connector 118. It is preferred for the ribs 168 thereof (the rib of the left forward guide tab being identical to the visible rib of the right forward guide tab) to be pronounced in size as compared with the ribs 160 of the left and right rear guide tabs so as to form a rib abutment 170, and for these ribs (168) to have a tapering width which increases with increasing distance away from the respective remote end 166. It is preferred for the left and right forward guide tabs 162, 164 to be wider than the left and right rear guide tabs 114, 116 so as to thereby define a pair of forward guide tab abutments 172.

Figure 6:
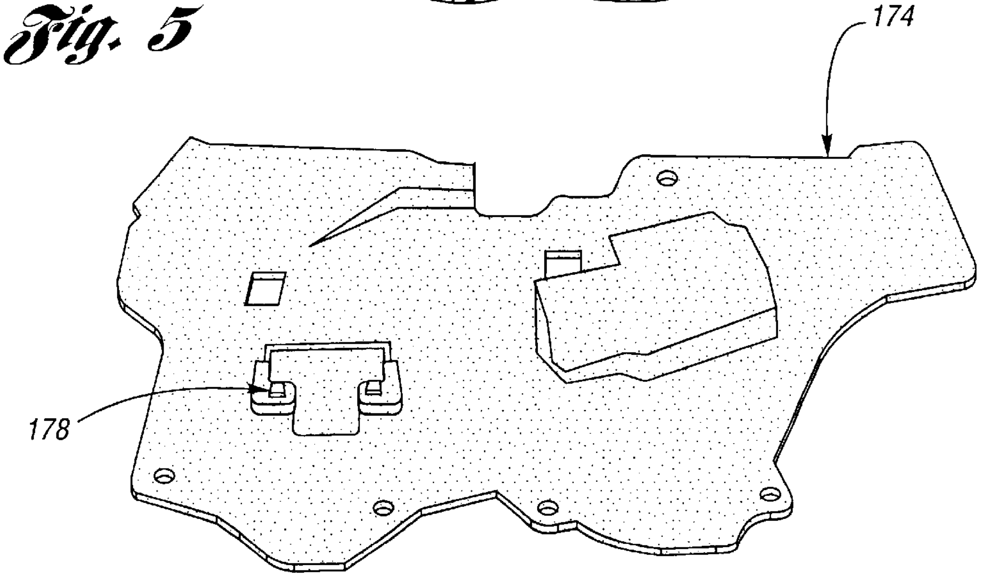
FIG. 6 is a perspective view of a port cover for being connected to an inner door frame so as to sealingly cover the port thereof.
Figure 7:
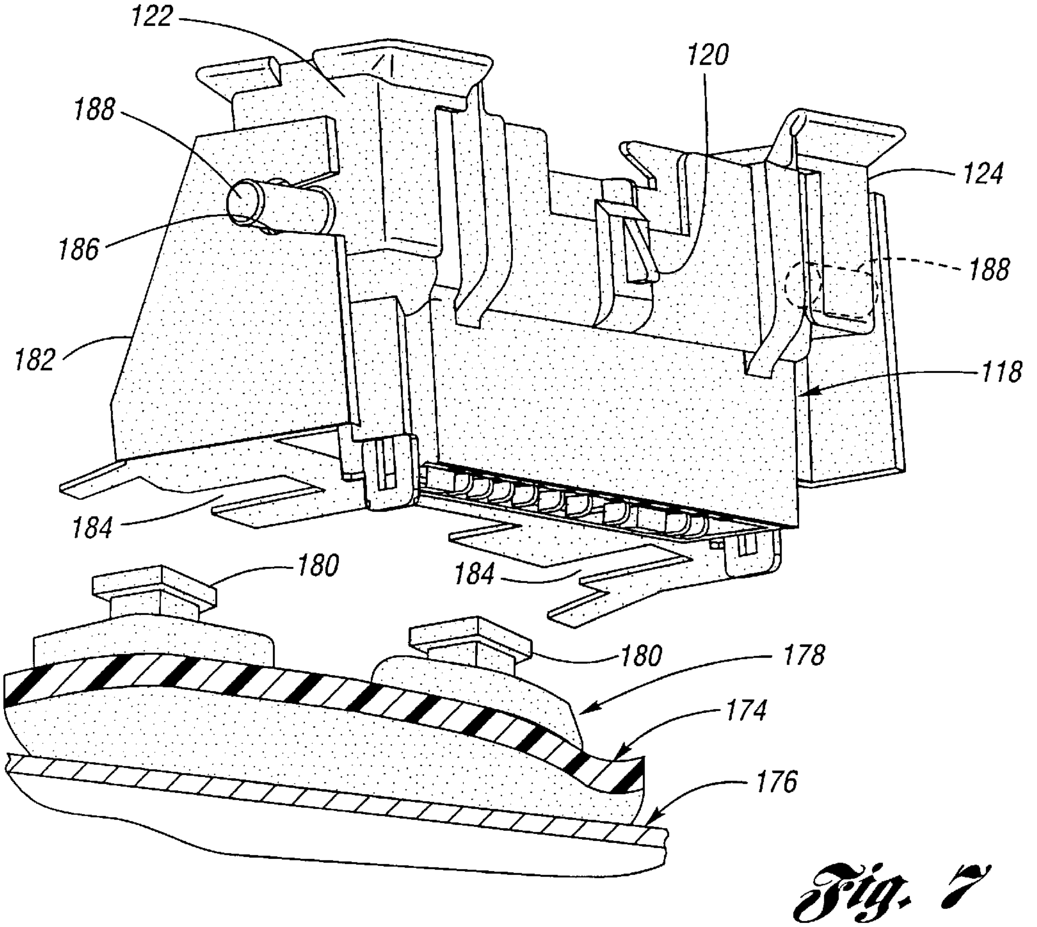
FIG. 7 is an exploded, partly sectional perspective view of the second connector about to be mounted to the inner door frame at the port cover thereof.

FIG. 6 depicts an example of a port cover 174 for sealably covering the port of an inner door frame 176 (shown at FIG. 7) in a manner well known in the art. The port cover 174 includes a slide mount 178 having a pair of flat-head posts 180. An attachment housing 182 includes a pair of post slots 184 for slidingly receiving the pair of flat-head posts 180. In this regard, the attachment housing 182 is slidingly mounted to the slide mount 178, whereupon it is stationarily held to the port cover and, consequently, the inner door frame 176. The attachment housing 182 has a right mounting hole 184 and a left mounting slot 186. A mounting stud 188 is connected with each of the left and right tab collets 122, 124, wherein each is pivotally interfaced, respectively, with the right mounting hole and the left mounting slot so as to pivotally connect the second connector 118 to the attachment housing 182.

Figure 4:
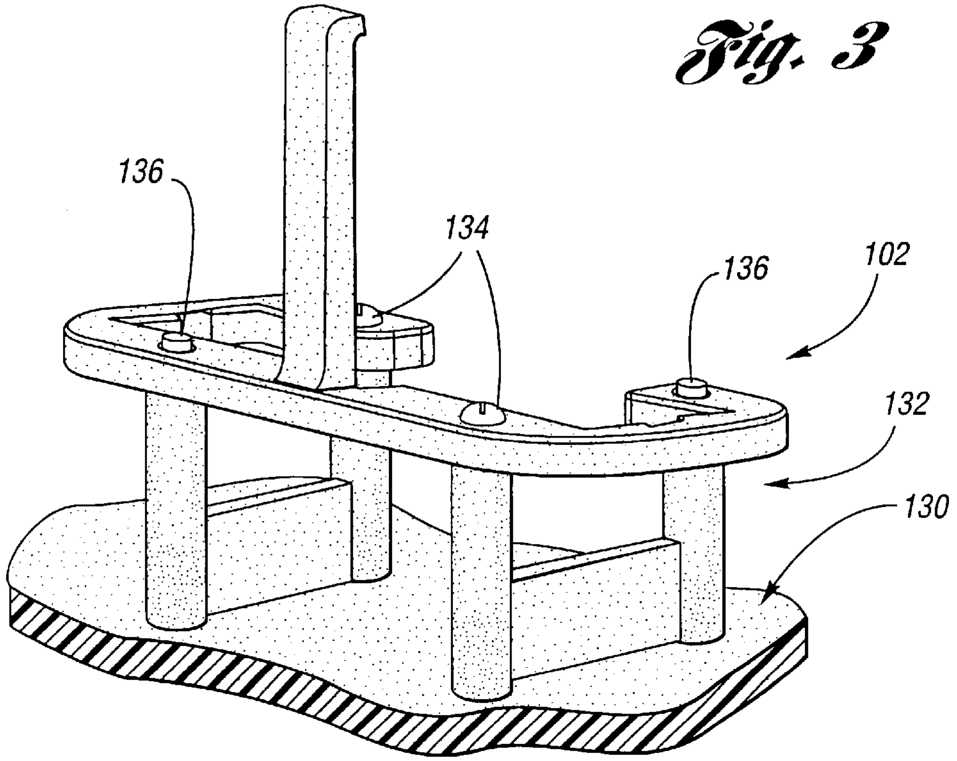
FIG. 4 is a partly sectional, perspective view of the connection assurance bracket, shown mounted to the door trim panel.
Figure 8:
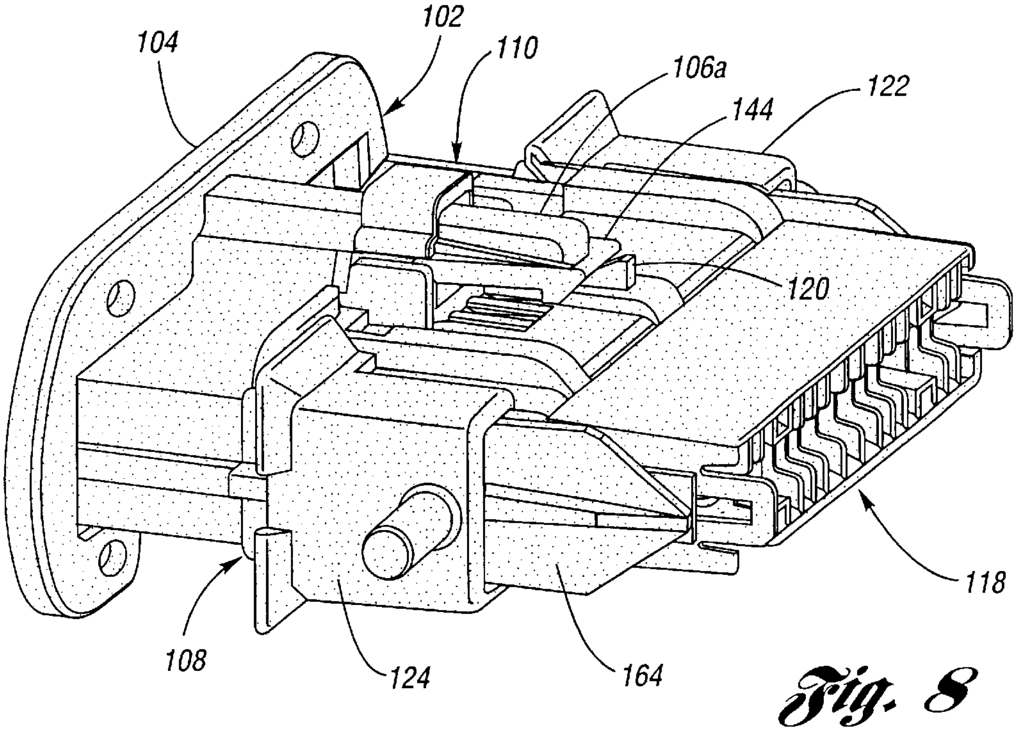
FIG. 8 is a perspective view showing the connection assurance bracket system, wherein the first connector is prestaged on the connection assurance bracket, and the second connector is prestaged on the first connector.
Figure 9:
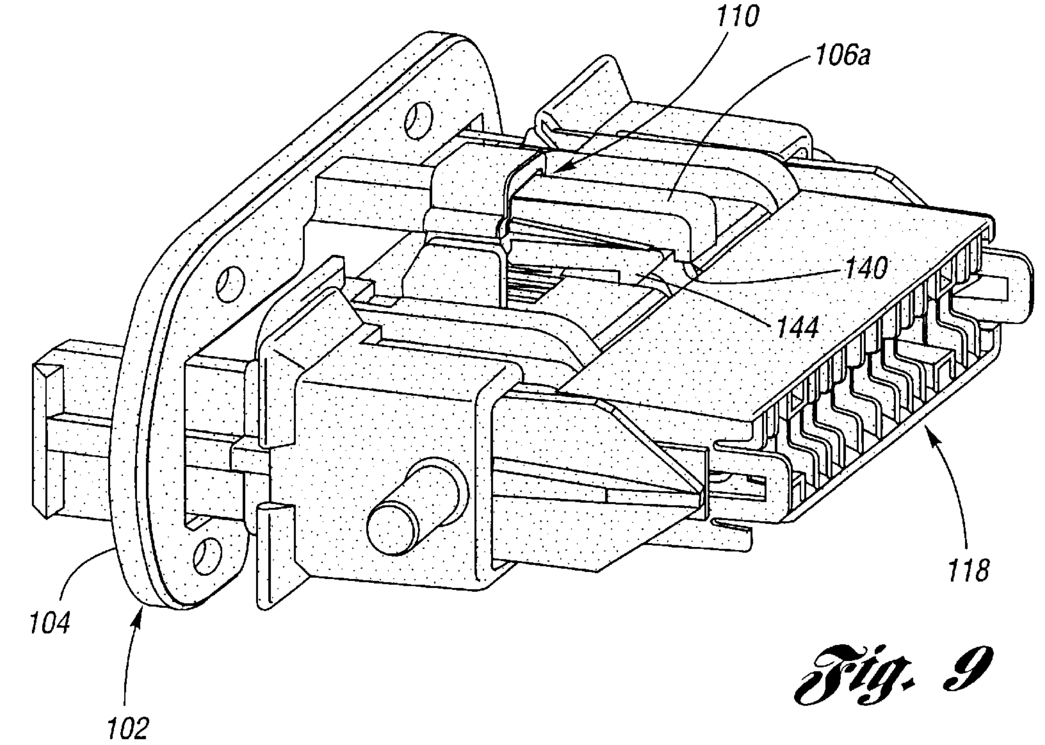
FIG. 9 is a perspective view showing the connection assurance bracket system, wherein the first connector is staged on the connection assurance bracket, and the first and second connector are fully engaged with each other, wherein a first limit of travel is shown.
Figure 10:
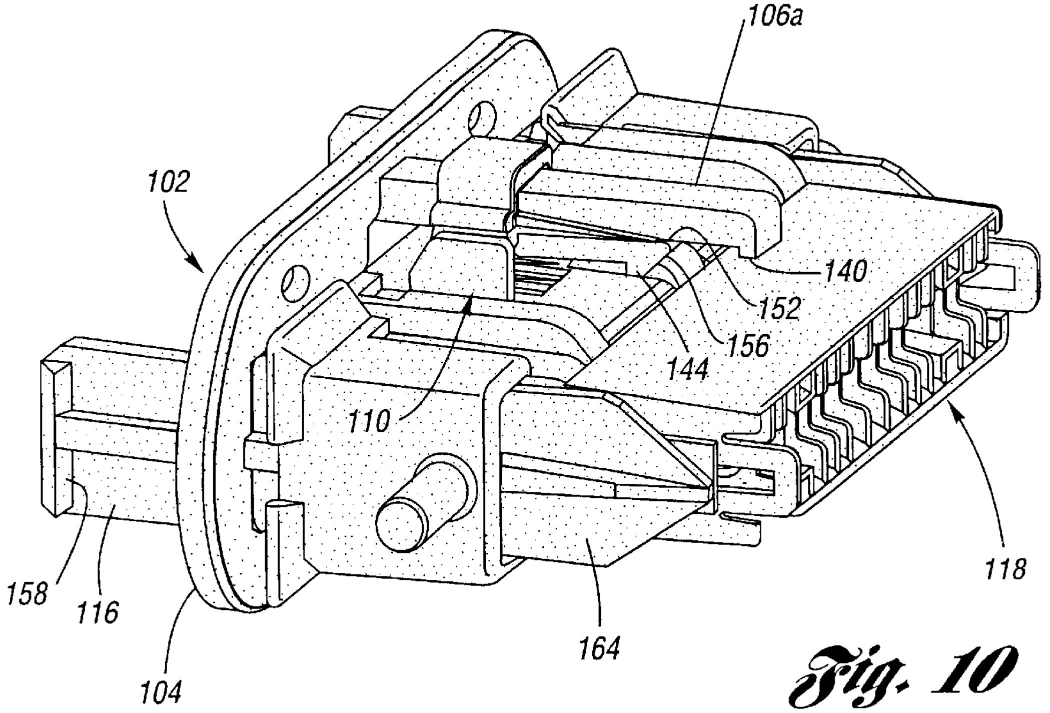
FIG. 10 is a perspective view showing the connection assurance bracket system, wherein the first connector is staged on the connection assurance bracket, and the first and second connector are fully engaged with each other, wherein now a second limit of travel is shown.

With the port cover sealably connected to the inner door frame, the base affixed to the stanchions of the door trim panel (as shown at FIG. 4), the second connector pivotally connected to its attachment housing and the attachment housing slidably connected to the slide mount of the port cover, operation of the connection assurance bracket system according to the present invention will be detailed, with reference in particular being directed to FIGS. 8, 9 and 10.

The first connector 108 is mounted onto the connection assurance bracket 102 so as to be prestaged with respect thereto, wherein the left and right rear guide tabs 114, 115 abut the left and right end walls 126, 128, the distal end portion 106*a* of the cantilever beam 106 is fully seated in the beam seat 112 of the pump-handle lock 110, and wherein the first connector is held prestaged by the distal end 106*b* and the lip 140 abutting the lock-bar 152 and opposingly by the left and right ear guide tab abutments 158 abutting the base 104.

At an early stage of mounting of the door trim panel to the inner door panel, the left and right forward guide tabs 162, 164 guidably enter into the left and right tab collets 122, 124. A point in the mounting procedure is then soon reached whereupon the pump-handle lock must surmount the ramped boss 120 if any further engagement is to occur between the first and second connectors; this constitutes a prestage position of the second connector with respect to the first connector. The top of the ramped boss and an upper surface of the lock-bar are substantially horizontally aligned when the first and second connectors are mutually aligned. Accordingly, if the first and second connectors are subjected to an engagement force, the ramp of the lock-arm rides over the ramped boss and upon entering the beam seat, the ramped boss pushes against the lip and thereupon causes the distal end to be moved out of interfering abutment with the lock-bar. Thus, as engagement force is further applied, the force is transmitted back as a reaction force by the inner door frame, via the distal end and the lip of the cantilever beam, to the lock-bar of the pump-handle lock, whereby the lock-bar is forced to surmount the ramped boss with a snap action, whereupon the distal end (inclusive of the lip) is moved out of interfering abutment with the lock-bar and is immediately projected forward, and free from, the lock-bar of the pump-handle lock, wherein the noise, vibration and sudden loss of reaction force from this event is notable by an assembler so as to give him or her assurance of the connection.

The staged position is now achieved, whereat the first and second connectors are mutually fully engaged. Now, the first and second connectors are movable in unison with respect to the connection assurance bracket. The sliding travel is defined by two limits: when the lip abuts the lock-bar, as generally shown at FIG. 9, and when the base abuts one or the other, or both, of the first and second connectors, as generally shown at FIG. 10. This sliding allows the interior trim panel to move inwardly and outwardly relative to the inner door frame, yet the first and second connectors will remain fully engaged and unmoved relative to each other.

To those skilled in the art to which this invention appertains, the above described preferred embodiments may be subject to change or modification. Such change or modification can be carried out without departing from the scope of the invention, which is intended to be limited only by the scope of the appended claims.

What is claimed is:

1. A connection assurance bracket system comprising:

a connection assurance bracket comprising a base having a front side and an opposite rear side, said connection assurance bracket further comprising a cantilever beam projecting from said front side of said base, said cantilever beam having a distal end portion terminating at a distal end; and a first connector having a beam seat for seatably receiving said distal end portion of said cantilever beam when said first connector is prestaged with respect to said connection assurance bracket;

wherein said base has a cut-out, the cut-out having a left end wall and an opposite right end wall; said first connector further comprising a left rear guide tab and a right rear guide tab, wherein when said first connector is prestaged with respect to said connection assurance bracket, said left rear guide tab abuts said left end wall, and said right guide tab abuts said right rear guide wall.

2. The connection assurance bracket system of claim 1, further comprising abutment means for retaining said first connector prestaged with respect to said connection assurance bracket.

3. The connection assurance bracket system of claim 2, wherein said first connector further comprises a pump-handle lock having a lock-arm pivotally mounted thereto, said lock-arm having a lock-bar at a forward end thereof, wherein said beam seat is defined by an opening formed in said lock-arm and wherein said lock-bar forms a forward end of said beam seat.

4. The connection assurance bracket system of claim 3 wherein said abutment means comprises said left rear guide tab having a left rear guide tab abutment and said right rear guide tab having a right rear guide tab abutment, wherein when said first connector is at said prestaged position relative to said connection assurance bracket, said distal end is in an interferingly abuttable relationship with said lock-bar and each of said left and right rear guide tab abutments are in an interferingly abuttable relationship with said rear side of said base.

5. The connection assurance bracket system of claim 4, wherein said first connector further comprises a beam brace connected with said pump-handle lock, wherein said cantilever beam passes under said beam brace when the distal end thereof is seated in said beam seat so as to capture said cantilever beam in said beam seat.

6. The connection assurance bracket system of claim 5, further comprising a second connector connectable with said first connector, said second connector having a ramped boss; wherein said lock-bar has a ramp at a forward side thereof opposite said beam seat for riding over said ramped boss as said first and second connectors are mutually connected.

7. The connection assurance bracket system of claim 6, wherein said ramped boss and an upper surface of said lock-bar are substantially mutually aligned along a direction parallel to the lock arm when said first and second connectors are mutually aligned, wherein when said first and second connectors are subjected to an engagement force, said ramp rides over said ramped boss and upon entering said beam seat causes said distal end to be moved out of interfering abutment with said lock-bar.

8. The connection assurance bracket system of claim 7, wherein said distal end further comprises a lip, wherein when said first and second connectors are mutually fully engaged said first and second connectors are movable in unison relative to said connection assurance bracket in a direction parallel with said cantilever beam between a first limit and an opposite second limit.

9. The connection assurance bracket system of claim 8, wherein said first limit is defined by said lip abutting said lock-bar, and wherein said second limit is defined by said base abutting at least one of said first and second connectors.

10. The connection assurance bracket system of claim 9 wherein said first connector further comprises a left forward guide tab aligned with said left rear guide tab, and a right forward guide tab aligned with said right rear guide tab; and wherein said second connector further comprises a left guide tab collet, wherein as said first and second connectors are mutually engaged, said left forward guide tab is guidably received into said left guide tab collet, and said right forward guide tab is guidably received into said right guide tab collet.

* * * * *